(12) United States Patent
Tisse (10) Patent No.: US 7,609,861 B2
(45) Date of Patent: Oct. 27, 2009

(54) DETERMINATION OF THE ORIENTATION OF THE RIDGES OF A FINGERPRINT

(75) Inventor: Christel-Loïc Tisse, Plan de Cuques (FR)

(73) Assignee: STMicroelectronics S.A., Montrouge (FR)

( * ) Notice: Subject to any disclaimer, the term of this patent is extended or adjusted under 35 U.S.C. 154(b) by 1226 days.

(21) Appl. No.: 10/417,677

(22) Filed: Apr. 17, 2003

(65) Prior Publication Data

US 2003/0198369 A1 Oct. 23, 2003

(30) Foreign Application Priority Data

Apr. 17, 2002 (FR) .................................. 02 04804

(51) Int. Cl.
*G06K 9/00* (2006.01)
*G06T 1/00* (2006.01)
*G06T 7/00* (2006.01)

(52) U.S. Cl. ..................... 382/124; 340/5.53; 340/5.83; 713/186

(58) Field of Classification Search ......... 382/115–127; 340/5.1, 5.2, 5.52, 5.53, 5.8–5.86; 902/3; 356/71; 713/186
See application file for complete search history.

(56) References Cited

U.S. PATENT DOCUMENTS 3,699,519 A * 10/1972 Campbell ................... 382/125

| | | | |
|---|---|---|---|
| 4,947,446 A | 8/1990 | Jutand et al. | |
| 5,073,958 A * | 12/1991 | Imme | 382/267 |
| 5,247,586 A * | 9/1993 | Gobert et al. | 382/278 |

OTHER PUBLICATIONS

French Search Report from French Patent Application 02/04804, filed Apr. 17, 2002.
C.-L Tisse et al. "Systeme automatique de reconnaissance d empreintes digitales. Securisation de I authentification sur carte a puce" 18E Colloque Gretsi '01 Sur Le Traitement Du Signal Et Des Images, Sep. 11, 2001, Toulouse, Frace, paragraphe "2.1 Pre-traitement des images d'empreintes digitales".
Kalle Karu et al.: "Fingerprint Classification" Pattern Recognition, Pergamon Press Inc. Elmsford, NY, US, vol. 29, No. 3, Mar. 1, 1996 pp. 389-404.
Ohteru S. et al.: "Automated Fingerprint Classifier" Proceedings Of The International Joint Conference On Pattern Recognition. Copenhagen, Aug. 13-15, 1974, Washington, I.E.E.E., US, vol. PROC.2, Aug. 13, 1974, pp. 185-186.
Jutand F. et al.: "A New VLSI Architecture For Large Kernal Real Timed Convolution" Speech Processing 2, VLSI, Audio And Electroacoustics, Albuquerque, Apr. 3-6, 1990, International Conference On Actoustics, Speech & Signal Processing, ICASSP, New York, IEEE, US, vol. 2, Conf. 15, Apr. 3, 1990, pp. 921-924.

(Continued)

*Primary Examiner*—Aaron W Carter
(74) *Attorney, Agent, or Firm*—Lisa K. Jorgenson; James H. Morris; Wolf, Greenfield & Sacks, P.C.

(57) ABSTRACT

A method and a circuit for determining the orientation of ridges of a digital image representing a fingerprint or the like, including for each image pixel, calculating a quantity taking into account the neighboring pixels in all directions, and of bidirectionally scanning the image line by line.

11 Claims, 2 Drawing Sheets

OTHER PUBLICATIONS

Rosenfeld, A. et al.: "Digital Picture Processing. Second Edition. vol. 1", 1982, London, UK, Academic Press, UK XP002234419, ISBN 0-12-597301-2, p. 6.

R.C. Gonzalex & R.E. Woods: "Digital Image Processing" Nov. 9, 2001, Prentice Hall XP002234420, p. 119.

Shigematsu S. et al. "A Hight Speed Pixel-Parallel Fingerprint identifier for fingerprint identification system on a single chip" ASIC/SOC Conference, 1999. Proceedings, Twelfth Annual IEEE International Washington, DC, USA, Sep. 15-18, 1999, Piscataway, NJ, USA, IEEE, US, Sep. 15, 1999, pp. 310-314.

* cited by examiner

DETERMINATION OF THE ORIENTATION OF THE RIDGES OF A FINGERPRINT

BACKGROUND OF THE INVENTION

1. Field of the Invention

The present invention relates to the field of fingerprint recognition, which is a well tried and tested technique for the identification of an individual. The present invention more specifically relates to processings to apply to digital images reproducing fingerprints to enable a comparison thereof.

2. Discussion of the Related Art

Methods and systems of fingerprint recognition based on digital images use various image-processing techniques. The aims of such processings is, generally, to improve the image definition and detect the positions of points, called minutiae, characteristic of the arrangement of the papillary lines of a fingerprint.

Among processings performed on digital images, the present invention more specifically relates to a step of determination of the orientation of the fingerprint ridges. This steps leads to the calculation of a directional image aiming at obtaining an image of the orientation of the fingerprint ridges. In other words, to each of the image pixels is assigned the orientation of the ridge to which it belongs.

Generally, this determination takes account of the image resolution and, more specifically, of the minimum and maximum widths of the ridges and valleys of the papillary arrangement in the digital image.

A first conventional method to determine the orientation of the ridges of a digital image reproducing a fingerprint consists of calculating the gradients at each point of the image in two orthogonal directions. The orientation is then determined by calculating the tangent of the gradient ratio, and this, for each image pixel. Generally, the calculations are rounded up by taking account of a limited number D of directions, for example, eight.

A second conventional method consists of calculating, for each image pixel and for an arbitrarily-chosen number D of directions, the sum of the differences between the grey level of the current pixel and the grey levels of the pixels surrounding it in each direction. On a ridge, this sum is maximum, and perpendicularly to a ridge, this sum is minimum. The minimum value obtained from the D calculated sums is thus selected, and the concerned pixel is assigned the orientation of the ridge to which it belongs. To enable such a determination, the number of pixels taken into account around the current pixel is determined according to the minimum and maximum possible widths of the ridges, and thus to the size and the resolution of the digital image.

This method amounts to applying, for each image pixel, and for each of D directions (for example, eight), the following formula:

$$K(i, j) = d\left[\text{MIN}_{d=0}^{D-1}\left(\sum_{k=1}^{L} |C(i, j) - Cd(i_k, J_k)|\right)\right], \text{ where:}$$

d designates the direction (d ranges between 0 and D−1, or between 1 and D);

MIN designates a function for selecting the value of d corresponding to the direction for which the sum is minimum;

K(i,j) is the orientation of the pixel of cartesian coordinates (i,j) in the resulting directional image, that is, value d assigned to the pixel;

C(i,j) is the grey level intensity of point (i,j) in the original image for which the formula is applied;

L represents the number of pixels taken into account to apply the formula, that is, the number of pixels on a line of direction d containing the point of coordinates (i,j);

k ranges between 1 and L and identifies the pixel of the line of direction d containing the point of coordinates (i,j); and $Cd(i_k, j_k)$ represents the intensity (grey level) of each pixel of rank k in the line of direction d containing the point of coordinates (i,j).

Number L (for example, equal to 13) is, in practice, determined by applying the following relation:

$L=2.Hd+1$, where:

Hd=(Wmax−1)/2 rounded up to the next higher integer; and

Wmax represents the maximum average width of the ridge, in number of pixels in the image to be processed.

Be it by the first or the second method, a resulting or directional image is obtained in which, for each pixel, a code representing one of the D directions is provided. This code may be assimilated to a grey level since it generally corresponds to a binary word having the same size as the grey level coding (for example, an 8-bit word enabling coding from 0 to 255), and since it could be used to generate an image, the grey levels of which would differentiate the codes. Accordingly, reference will sometimes be made hereafter to "grey levels" to designate the values given to points of a matrix corresponding to image pixels, even if these values do not actually really represent grey levels of the original image.

Once the directional image has been obtained, the average orientation of blocks b dividing up this image is determined. The size chosen for the blocks is set by the number of pixels taken into account around the current pixel to determine the ridge direction, which is itself a function of the minimum and maximum possible widths (in number of pixels) of a fingerprint ridge in the considered image.

For each block b, the direction d which most frequently appears in its pixels (among the D defined directions) is determined by applying a histogram calculation to determine the most frequent direction in the concerned block. This amounts, for each block b and for each direction d, to applying the following relation:

$HIST(d)=Pd/X$, where:

HIST represents the calculated discrete histogram function;

Pd represents the number of pixels of the directional image block having direction d, and X represents the total number of pixels in the block.

Eight values HIST are obtained for each block and the direction d corresponding to the greatest value is chosen as the orientation O(b) of block b. This amounts to applying the following formula:

$$O(b) = d\left[\text{MIN}_{d=0}^{D-1}(HIST(d))\right], \text{ where:}$$

MAX designates a function of selection of the value of d corresponding to the direction for which the histogram function provides the maximum value.

Different conventional processings are then implemented on the original image to more reliably determine, by means of the obtained orientation image, the respective positions of the minutiae and, on the same occasion, the orientation of the papillary arrangement which surrounds them locally.

An example of application of the above second method is described in article "Système automatique de reconnaissance d'empreintes digitales. Sécurisation de l'authentification d'une carte á puce" by Christel-Loïc Tisse, Lionel Martin, Lionel Torres, and Michel Robert, published in September 2001 in GRETSI'01 proceedings, Sept. 10-11, 2001, Toulouse (FR), which is incorporated herein by reference.

An obvious disadvantage of the first method is the large amount of complex calculations to be performed, in particular to calculate the tangents at each point in the image.

As for the second method, it requires a significant number of accesses to a memory (or memory area) in which the original image is stored.

Further, be it in the first or in the second method, a second series of memory accesses must be performed to calculate the average orientations of the blocks based on the stored directional image.

The significant number of memory accesses considerably slows down the image processing.

Moreover, the large number of pixels (several hundreds in each direction of the image) makes the execution of the calculations by groups of pixels in parallel over the entire image unrealistic. Now, in integrated applications, it is often preferable to process repetitive calculations by means of components in wired logic rather than by means of a processor executing calculation instructions of a software program.

SUMMARY OF THE INVENTION

The present invention aims at providing a novel method of determination of the directions of ridges of a fingerprint in the form of a digital image, which overcomes the disadvantages of known methods.

The present invention more specifically aims at providing a solution which is particularly well adapted to a hardware execution of the calculations.

The present invention further aims at reducing or minimizing the number of memory accesses necessary to load the grey levels of the pixels which much take part in the calculations.

To achieve these and other objects, the present invention provides a method for determining the orientation of ridges of a digital image representing a fingerprint or the like, comprising for each image pixel, calculating a quantity taking into account the neighboring pixels in all directions, and of bidirectionally scanning the image line by line.

According to an embodiment of the present invention, the orientation calculations take into account an even number (L−1)/2 of pixels on either side of the current pixel in a predetermined number D of directions, and the orientation of the pixels of the image sides over (L−1)/2 pixels in height and widthwise are not calculated.

According to an embodiment of the present invention, the method is implemented by means of a circuit of bidirectional shift registers enabling parallel loading of the words of each register.

The present invention also provides a circuit for temporarily storing blocks of a digital image, comprising:

a matrix of V shift registers of U words to store an image block of U*V pixels;

two shift registers for loading in a first direction, said two registers being unloadable in parallel into the first, respectively last, words of all registers in the matrix; and at least one shift register for loading in the other direction, unloadable in parallel into all words of the first or last matrix register, the different registers being interconnected to enable loading of the image by blocks in the first direction, in both directions, and in the second direction.

According to an embodiment of the present invention, the size of the words corresponds to the number of bits over which are coded the grey levels of the image pixels.

The present invention also provides a circuit for determining the orientation of lines in a digital image, comprising a temporary storage circuit, the parallel outputs of the matrix registers being connected to inputs of a first wired logic circuit of calculation of the individual orientations of the image pixels.

According to an embodiment of the present invention, to outputs of the first circuit are connected to a set of latches for temporarily storing the individual orientations, outputs of the latches being connected to inputs of a second wired logic circuit of calculation of the average orientation of the image blocks.

According to an embodiment of the present invention, the circuit for determining the orientation of lines in a digital image comprises a control circuit in wired logic.

According to an embodiment of the present invention, the circuit for determining the orientation of lines in a digital image is applied to the determination of the orientation of ridges in a digital image representing a fingerprint or the like.

The foregoing objects, features and advantages of the present invention, will be discussed in detail in the following non-limiting description of specific embodiments in connection with the accompanying drawings.

DETAILED DESCRIPTION

For clarity, only those elements of the storage circuit and those method steps that are necessary to the understanding of the present invention have been shown in the drawings and will be described hereafter. In particular, the steps upstream and downstream of the determination of the ridge orientation have not been described in detail. Further, the steps executing the actual calculations (sum, subtraction, etc.) have not been detailed and may be implemented using conventional processes. Further, the circuits of storage and addressing of the entire image, be it the original image or the directional image, have not been illustrated and are conventional.

The present invention provides a matrix of temporary storage (for example, by means of registers) of an image block representing the papillary arrangement, the average direction of which is desired to be determined, and a specific addressing of this storage matrix, to reduce or minimize the number of accesses to a memory for storing the entire image.

Figure 1:
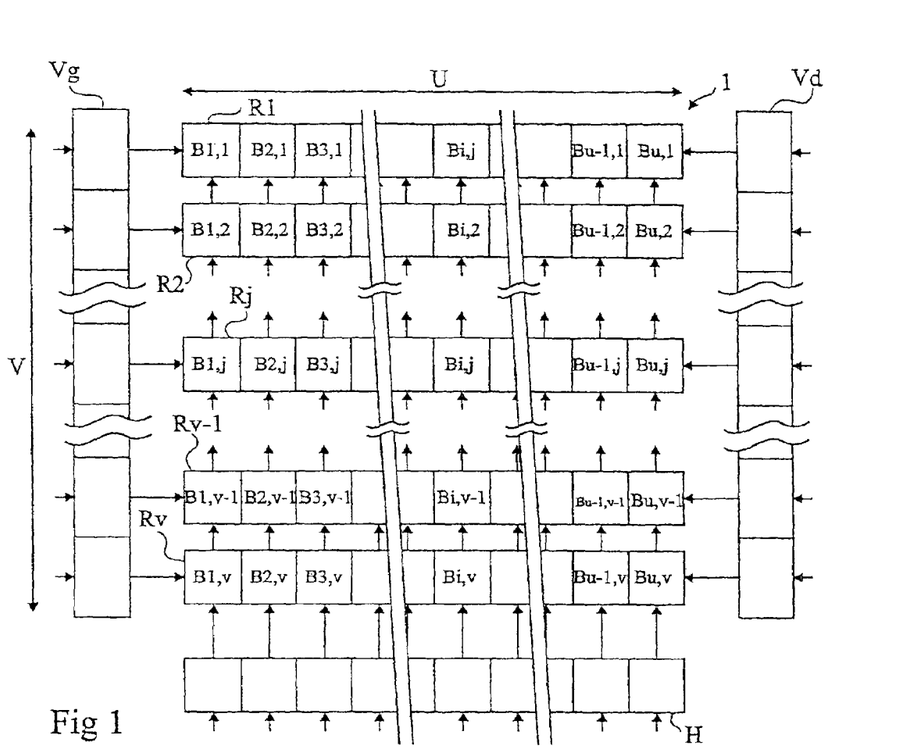
FIG. 1 schematically shows an embodiment of a matrix for storing an image pixel block according to the present invention.

FIG. 1 is a simplified view in the form of blocks of a circuit 1 of temporary storage of grey levels of pixels of an image to be processed according to the present invention. This circuit comprises V bidirectional shift registers R1, R2, . . . , Rj, . . . RV-1 and RV, capable of each storing U words B1j, B2j, . . . , Bij, . . . BU-1j, BUj, representative of a pixel grey level. For example, each word is an eight-bit word enabling storage of 255 grey levels. The size of the memory word matrix thus formed preferably corresponds to that of a block of the image, the average orientation of which is desired to be determined (U*V=X). For simplification, the same column and line indexes i and j have been used to designate the pixels in the entire image.

Registers Rj are each connected to enable parallel loading and unloading of the X words Bij. Further, they are connected so that the X words can be simultaneously discharged (in a single cycle) towards operators (not shown), preferably in wired logic, executing the orientation calculations.

The set of registers Rj is associated with three loading registers, respectively vertical Vg and Vd and horizontal H. The size (number of words) of the vertical registers is V while that of the horizontal register is U. The reference to the vertical and horizontal orientations is taken in the orientation of the drawings, but may of course be reversed.

Registers Vd, Vg, and H are unloadable in parallel towards registers Rj and, preferably, loadable in parallel from outside of matrix 1, that is, from the original image storage memory. As an alternative, the loading into registers Vd, Vg, and H is a series loading, that is, one cycle is used to load a word into one of these registers. The required time is not an obstacle, provided to keep a parallel unloading. Indeed, register Vd, Vg, or H according to the current position in the original image may be loaded word by word during the calculations performed on the current pixel matrix present in registers Rj.

For simplification, the different control connections for starting the shifting and loading/unloading the different registers have not been shown in FIG. 1. It should only be noted that vertical registers Vg and Vd are, preferably, controllable to be vertically shifted in a single direction, while horizontal register H is controllable to shift to the right or to the left, registers Rj being controllable for shifting in all directions.

The orientation calculations of each pixel to obtain the directional image, and the calculations of average orientation of the blocks, are performed in a single step, that is, for a given block, with no new access to a storage memory. To achieve this, the individual orientation of each pixel is, according to the present invention, determined by applying the second previously-described method. Advantage is then taken from the fact that, as indicated previously, the size (width and length) of the blocks generally corresponds to the number of pixels taken into account in each direction to determine the individual orientation of each pixel according to this method. More generally, for this feature of the present invention to be respected, it is enough for the block size to be smaller than the number of pixels taken into account to determine the individual orientation of each pixel. In other words, it is enough for each block to entirely fit into the temporary storage matrix. On this regard, it should be noted that the storage matrix is preferentially, but not necessarily, square (U=V). The same can be said of the blocks.

The original image, entirely stored in a memory or memory area not shown, is horizontally and vertically scanned from one pixel to the next with a specific course further limiting the number of accesses to the memory storing the entire image.

Figure 2:
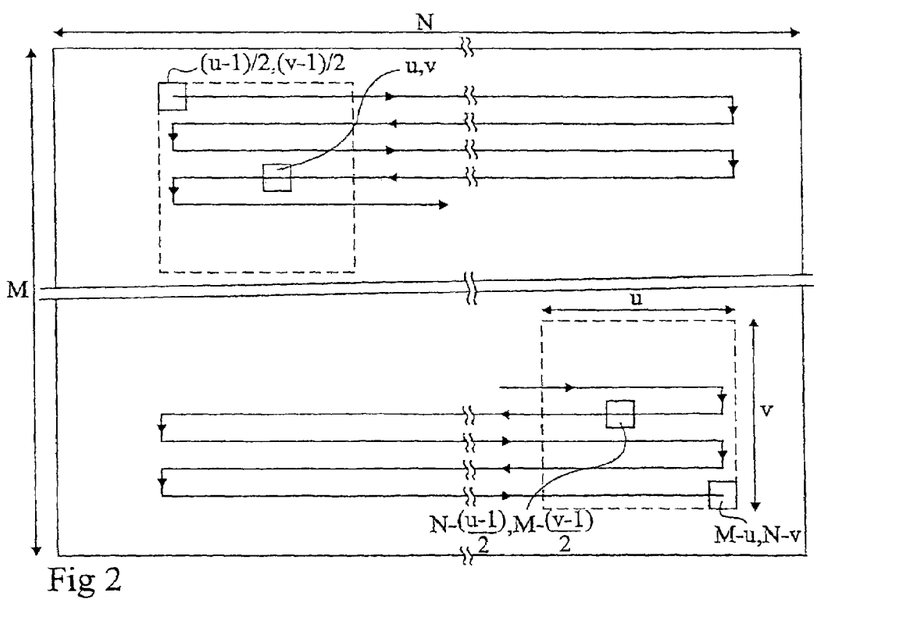
FIG. 2 illustrates, in a simplified view of an image to be processed, an implementation mode of the method according to the present invention.

FIG. 2 shows a simplified view of a fingerprint image I to be processed in orientation calculation according to the present invention. Image I is in fact stored in a RAM not shown, accessible by the control processor of the print recognition system. The memory storing image I is sized according to the size of this image to contain the respective grey levels of each of the pixels thereof. In FIG. 2, the case of an image of M pixel lines and N pixel columns is considered.

Vertical loading registers Vg and Vd and horizontal loading register H are used to preload a next line, respectively, column, to scan the entire image I. Thus, according to a feature of the present invention illustrated by the path in arrows of FIG. 2, the processing performed on the image pixels is performed by scanning this image line by line. Further, this line-by-line scanning is performed back and forth, that is, changing directions (from left to right or from right to left) for each pixel line. This is why two vertical loading registers Vg and Vd are provided, according to the current line scan direction. The present invention here takes advantage of the fact that the calculations performed and the stored results need not be in a specific order. This enables avoiding a line-by-line scanning in a single direction, as would be the case for the processing of images for display. According to the present invention, what matters is to successively shift from one column to the next column, then from the end of a column to the next line, to reduce or minimize the number of memory accesses. The fact of starting in the reverse direction at the end of a current line to process the next line is no obstacle for the calculations performed by the present invention. On the contrary, this has the considerable advantage of not having to reload, even at the end of a line, a complete matrix of U*V pixels.

Figure 3:
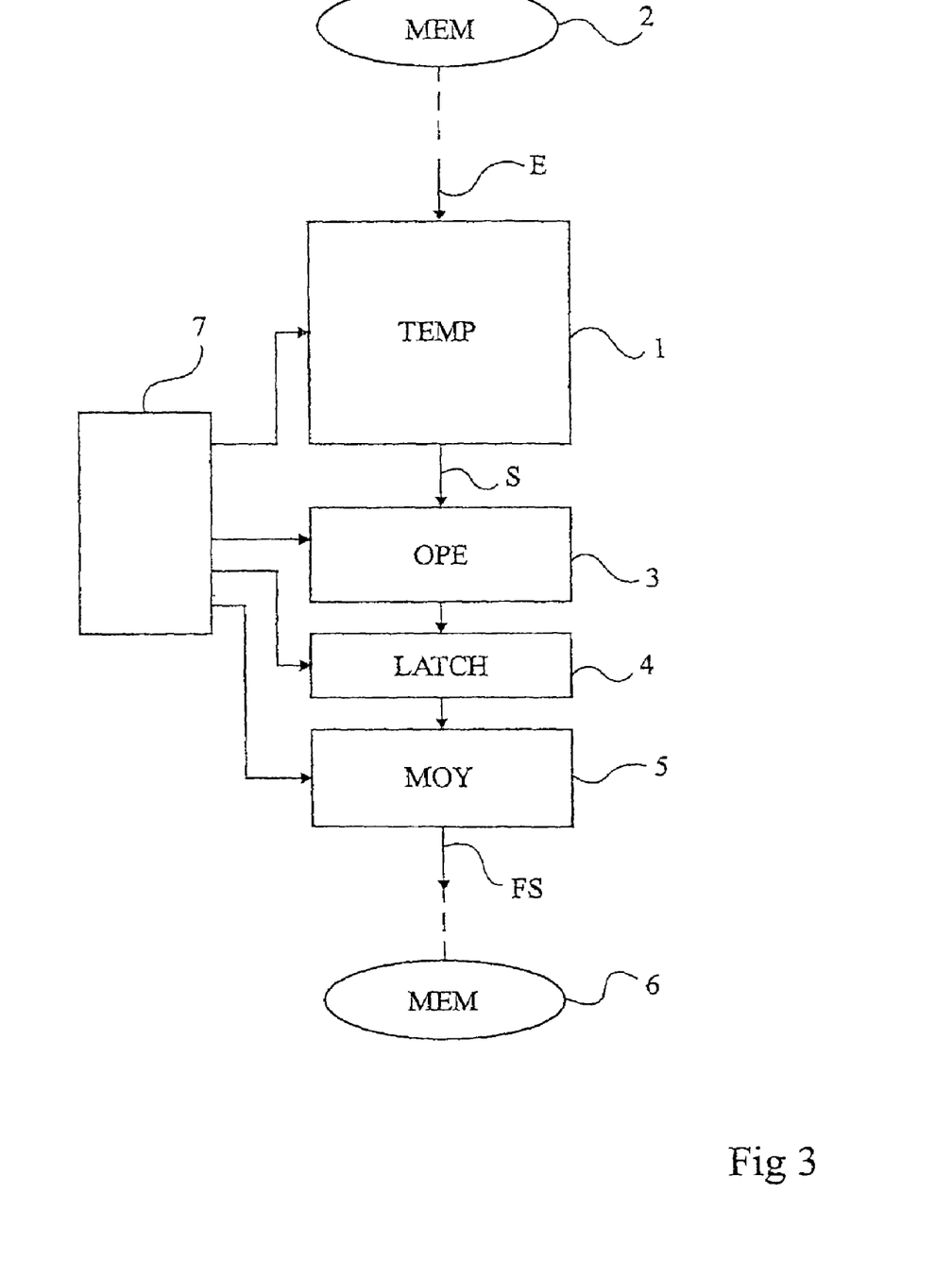
FIG. 3 very schematically shows in the form of blocks an embodiment of a circuit for calculating the average orientations of blocks of a digital image according to the present invention.

FIG. 3 very schematically shows in the form of blocks the architecture of a circuit for calculating the average orientations of blocks of an image according to an embodiment of the present invention.

Temporary storage array 1 (TEMP), the inputs of which (generally designated with reference E in FIG. 3) receive the grey levels of the pixels of the original image stored in a memory 2 (MEM), comprises as many (U*V) outputs S as it comprises words.

According to the present invention, each pixel of word Bij of a register Rj of temporary storage circuit 1 is associated with the calculator necessary to determine the orientations by application of conventional formulas. In other words, the different registers are read from simultaneously and in parallel to execute the operations necessary to the calculation of the following formula:

$$K(i, j) = d\left[\text{MIN}_{d=0}^{D-1}\left(\sum_{k=1}^{L} |C(i, j) - Cd(i_k, J_k)|\right)\right].$$

All the above operations may be performed by means of a circuit 3 in wired logic (OPE), if need be equipped with synchronization ports (not shown). The synchronization ports are however optional for the processing of square matrixes (U=V). The practical forming of circuit 3 executing operations (additions, subtractions, comparisons, etc.) necessary to the calculation of the above formula is within the abilities of those skilled in the art.

The formula is applied to each shifting of a pixel in the scanning. However, the calculation of the average orientation of the blocks is, preferably, only performed periodically, when all individual calculations are available. For this purpose, downstream of the operators (circuit 3) executing the preceding formula, a set 4 of latches is provided, to store the U*V individual orientations K of the pixels. The outputs of latches 4 are connected to a second circuit 5 in wired logic for calculating the average orientation (MOY). For non-overlapping blocks (as is the case for fingerprint processing), this amounts to executing, based on the intermediary results stored in the latches and all the U−1 columns and V−1 lines (and thus, for each block), the calculations of the following formula:

$$O(b) = d\left[\operatorname*{MIN}_{d=0}^{D-1}(HIST(d))\right].$$

The number of applications of the above formula thus is (U−1)*(V−1), less frequent than that of application of the individual orientation calculation formula. It is however not necessarily disturbing to perform the calculation of the average orientation of a U*V-pixel block for each shifting, if this does not take too much time. This then simplifies the calculation synchronization and it is enough to only take into account one result every U−1 columns and every V−1 lines.

In the case of partially overlapping blocks, the periodicity of the average orientation calculation or of its taking into account is adapted.

The number of latches of circuit 4 depends on the block size and on the number of bits coding each pixel.

The final results, that is, the average orientations of the blocks, provided by outputs FS of circuit 5, are stored in a RAM area 6 (MEM) external to circuit 1. This area is then accessible, conventionally, by the processor of the fingerprint recognition system. If desired, a directional image containing the individual orientations of all pixels may also be stored.

Of course, other memory areas are used to store other images resulting from conventional intermediary calculations which are not described in detail. These will be, for example, the different images provided by different filterings.

Another feature of the present invention is not to take into account the sides of original image I for the calculation of the individual pixel orientation. Indeed, the calculation of the orientation of a pixel with respect to the pixels surrounding it takes into account the two pixels on either side of the current pixel in each direction d. Accordingly, the side calculations will anyhow be inaccurate if they do not take into account the L (for example, 13) required pixels. In practice, the orientation results are unexploitable if the current pixel is not surrounded, in each of the D directions d, with the (L−1)/2 (for example, 6) required pixels. In other words, assuming blocks of U*V pixels, the first U*V image pixels are first loaded, and the first pixel for which the orientation is calculated has coordinates (U−1)/2, (V−1)/2 (FIG. 2). The first block for which the average orientation is determined is the block centered on the pixel of coordinates U, V. At the end of an image, the last pixel for which the orientation is calculated is the pixel of coordinates N−(U−1)/2, M−(V−1)/2, and the last block is centered on the pixel of coordinates M−U, N−V.

An advantage of not taking into account the sides is that the calculation and the loading of the image sides is avoided, which represents M*(U−1)+N*(V−1) cycles. Further, this is not disturbing since, in addition to the above-mentioned inaccuracy, the image sides are statistically the regions where the information quality (print pattern) is the poorest (area of lesser contact between the finger and the sensor).

The managing and the multiplexing of the inputs of circuit 1 of registers and the storage for loading/unloading in the RAM are performed by conventional circuits and elements. Preferably, a logic control circuit 7 (CTRL), independent from the processor of the print recognition system, enabling execution in wired logic of all controls, will be provided. Circuit 7 then controls circuits 1, 3, 4, and 5. This is made possible in the application of the present invention since the image is known in advance, as well as the respective sizes of the blocks to be processed.

As a specific example of implementation, the blocks to be processed are blocks of 13*13 pixels and the entire image represents 338*334 pixels. A systematic loading of a matrix of 13*13 pixels for the entire image would require more than 13 millions of memory accesses. According to the present invention, only a little more than one million (1,028,352) memory accesses are required to implement the calculation. On the side of the latches for temporarily storing the pixel orientation before calculation of the average block orientation, a complete loading of the image would require more than 85,000 latches. According to the present invention, only a little more than 200 latches (208) is enough.

Of course, the present invention is likely to have various alterations, modifications, and improvement which will readily occur to those skilled in the art. In particular, the sizes given as an example may be modified, provided to respect the functionalities of a bidirectional scanning of the image to be processed. Further, the practical implementation of storage circuit 1, of calculation circuits 3, 4, 5, and of logic control circuit 7 are within the abilities of those skilled in the art based on the functional indications given hereabove. Further, although the present invention has been described in its application to the processing of fingerprints, it should be noted that it more generally applies to any calculation of line orientation in a digital image, compatible with the constraints encountered in the case of fingerprints.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for determining orientations of ridges of a digital image representing a fingerprint, the digital image being stored as a matrix in a memory, and the digital image having a plurality of lines of pixels and a plurality of side edges, each of the pixels having a stored pixel grey level, the method comprising:

bidirectionally scanning the stored digital image by scanning the lines of pixels line by line for the pixel grey levels, wherein bidirectionally scanning comprises scanning a first pixel line in a first scanning direction and scanning a second pixel line in a second, reverse scanning direction;

for each pixel, executing an orientation calculation using operators, and assigning an orientation quantity to the pixel, by taking into account pixel grey levels of neighboring pixels lying along a plurality of directions, each direction in the plurality of directions having a first direction extending away from the pixel and a second direction extending away from the pixel, the second direction being opposite to the first direction.

2. The method of claim 1, wherein executing an orientation calculation and assigning an orientation quantity to each pixel comprises taking into account an even number of pixels on both sides of the current pixel in the plurality of directions, without assigning an orientation quantity to the pixels located near edges of the digital image where the even number of pixels to be taken into account would extend beyond the edges of the digital image.

3. The method of claim 1, implemented by means of a circuit of bidirectional shift registers enabling parallel loading of words of each register.

4. The method of claim 2, wherein the even number of pixels is equal to half of a maximum average width of the ridges, in units of pixels, and if half of the maximum average width of the ridges is an odd number, the even number of pixels when equal to half of the maximum average width of the ridges rounded up to the next higher integer number of pixels.

5. A device for determining orientations of lines in a digital image, comprising:
- a plurality of bidirectional matrix shift registers configured to allow parallel loading and unloading of words for each matrix shift register, each word representing a pixel grey level;
- a first wired logic circuit that is configured to receive, as inputs, words unloaded in parallel from the matrix shift registers;
- wherein the wired logic circuit is configured to calculate the orientation of a ridge at a pixel location by using the pixel grey levels of neighboring pixels surrounding said pixel location to calculate an orientation quantity, and is further configured to assign the orientation quantity to said pixel.

6. The device of claim 5, wherein the lines in the digital images are ridges in a digital fingerprint image.

7. The device of claim 5, in combination with a digital image device.

8. A method for determining orientations of ridges of a digital image representing a fingerprint, the digital image being stored in a memory, the digital image comprising a plurality of lines of image pixels, the method comprising:
- bidirectionally scanning the image line-by-line for pixel grey levels, wherein bidirectionally scanning comprises scanning a first pixel line in a first scanning direction and scanning a second pixel line in a second, reverse scanning direction; and
- for each image pixel, using a wired logic circuit to calculate an orientation quantity taking into account grey levels of neighboring pixels in a plurality of directions.

9. The method of claim 8, wherein orientation calculations take into account grey levels of an even number of pixels on both sides of a given pixel in a predetermined number of directions, and wherein an orientation calculation for a given pixel near an image side does not take into account grey values of pixels that extend beyond the image side.

10. The method of claim 8, wherein bidirectionally scanning the image line-by-line comprises using a circuit of bidirectional shift registers having words, the bidirectional shift registers permitting parallel loading of the words of each register.

11. The method of claim 1, wherein executing an orientation calculation using operators comprises executing an orientation calculation using a wired logic circuit.

* * * * *

UNITED STATES PATENT AND TRADEMARK OFFICE
CERTIFICATE OF CORRECTION

PATENT NO. : 7,609,861 B2  Page 1 of 1
APPLICATION NO. : 10/417677
DATED : October 27, 2009
INVENTOR(S) : Christel-Loïc Tisse It is certified that error appears in the above-identified patent and that said Letters Patent is hereby corrected as shown below:

Col. 2, line 58 should read:

$$O(b) = d\left[ \mathop{MAX}_{d=0}^{D-1} (HIST(d)) \right]$$

Col. 7, line 5 should read:

$$O(b) = d\left[ \mathop{MAX}_{d=0}^{D-1} (HIST(d)) \right]$$

Signed and Sealed this

Eighth Day of December, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,609,861 B2 | Page 1 of 1 |
| APPLICATION NO. | : 10/417677 | |
| DATED | : October 27, 2009 | |
| INVENTOR(S) | : Christel-Loïc Tisse | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1895 days.

Signed and Sealed this

Twelfth Day of October, 2010

David J. Kappos
*Director of the United States Patent and Trademark Office*